US008559106B2

(12) United States Patent
Umemoto et al.

(10) Patent No.: US 8,559,106 B2
(45) Date of Patent: Oct. 15, 2013

(54) WATER-RESISTANT POLARIZING FILM, PROCESS FOR PRODUCING WATER-RESISTANT POLARIZING FILM, AND IMAGE DISPLAY DEVICE

(75) Inventors: Toru Umemoto, Ibaraki (JP); Toshimasa Nishimori, Ibaraki (JP); Tadayuki Kameyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 394 days.

(21) Appl. No.: 13/002,868

(22) PCT Filed: Apr. 20, 2010

(86) PCT No.: PCT/JP2010/056979
§ 371 (c)(1),
(2), (4) Date: Jan. 6, 2011

(87) PCT Pub. No.: WO2010/131549
PCT Pub. Date: Nov. 18, 2010

(65) Prior Publication Data
US 2011/0205629 A1    Aug. 25, 2011

(30) Foreign Application Priority Data

May 12, 2009    (JP) .................. 2009-115283

(51) Int. Cl.
*G02B 1/08*    (2006.01)
*G02B 5/30*    (2006.01)
(52) U.S. Cl.
CPC .................... *G02B 5/3033* (2013.01)
USPC .................. 359/487.02; 427/163.1
(58) Field of Classification Search
USPC ............ 359/487.02, 487.01, 483.01, 487.05, 359/487.06, 491.1, 491.01; 428/704; 362/19; 353/20; 252/582–589; 427/162–169
See application file for complete search history.

(56) References Cited

U.S. PATENT DOCUMENTS

| | | |
|---|---|---|
| 2004/0009414 A1 | 1/2004 | Araki |
| 2011/0097483 A1 | 4/2011 | Umemoto et al. |

FOREIGN PATENT DOCUMENTS

| | | |
|---|---|---|
| JP | 11-021538 A | 1/1999 |
| JP | 2008-150517 A | 7/2008 |
| JP | 2009-014959 A | 1/2009 |
| WO | 2009/154010 A1 | 12/2009 |

OTHER PUBLICATIONS

English Machine Translation of JP11-21538, previously submitted on Jan. 6, 2011.
English Machine Translation of JP2008-150517, previously submitted on Jan. 6, 2011.
English Machine Translation of JP2009-14959, previously submitted on Jan. 6, 2011.
International Search Report of PCT/JP2010/056979, mailing date Jun. 15, 2010.
Extended European Search Report dated Feb. 4, 2013, issued in corresponding European Patent Application No. 10774807.1.

*Primary Examiner* — Stephone Allen
*Assistant Examiner* — Jeffrey Madonna
(74) *Attorney, Agent, or Firm* — Westerman, Hattori, Daniels & Adrian, LLP

(57) ABSTRACT

A water-resistant polarizing film having an organic colorant having an anionic group, and organic nitrogen compounds. The organic nitrogen compounds include a first organic nitrogen compound having at least two nitrogen atoms in the molecule thereof, and a second organic nitrogen compound having at least two nitrogen atoms in the molecule thereof. The distance (A) between adjacent nitrogen atoms in the first organic nitrogen compound is shorter than the distance (B) between adjacent atoms of the nitrogen atoms in the second organic nitrogen compound.

11 Claims, 1 Drawing Sheet

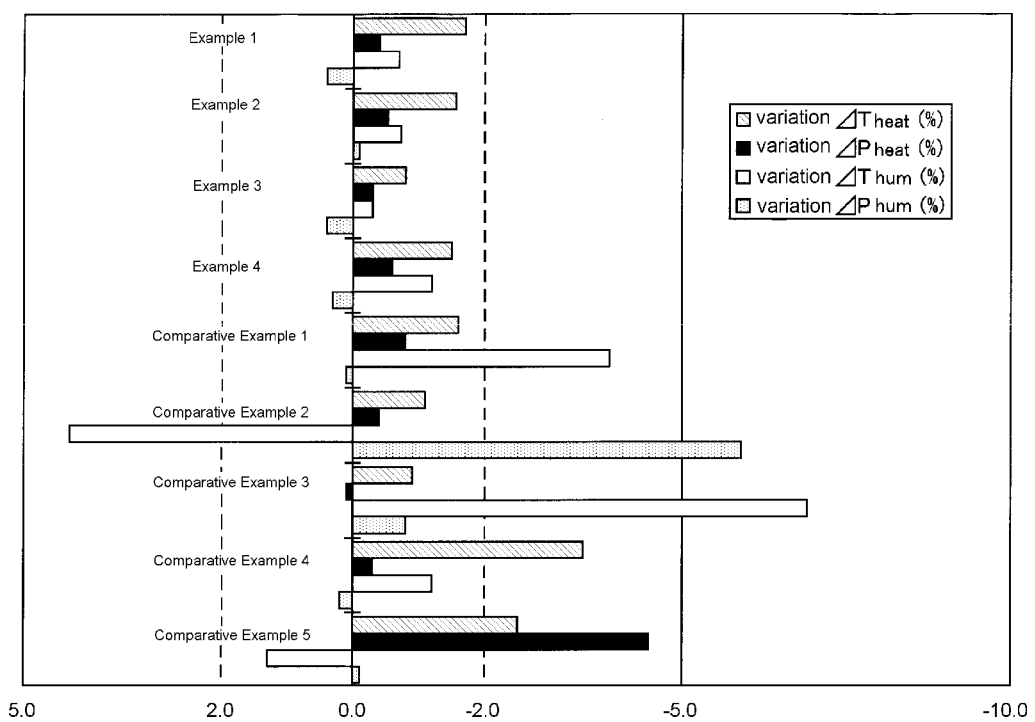

WATER-RESISTANT POLARIZING FILM, PROCESS FOR PRODUCING WATER-RESISTANT POLARIZING FILM, AND IMAGE DISPLAY DEVICE

TECHNICAL FIELD

The present invention relates to a water-resistant polarizing film, which is excellent in endurance.

BACKGROUND ART

Hitherto, a water-resistant polarizing film which contains an organic colorant (dye) having an anionic group such as a sulfonic acid group, and an organic nitrogen compound having a nitrogen atom has been known.

For example, Patent document 1 discloses that a water-resistant polarizing film is yielded by applying a solution containing an organic nitrogen compound having two or more nitrogen atoms onto a surface of a polarizing film containing an organic colorant having an anionic group.
Patent document 1: JP-A-11-21538

SUMMARY OF INVENTION

The water-resistant polarizing film of Patent document 1 described above has a certain measure of water resistance.

However, when this water-resistant polarizing film is kept at high temperature and/or high humidity, optical properties thereof are easily deteriorated (hereinafter, the wording "at high temperature and/or high humidity" will be referred to as "at high temperature and high humidity").

An object of the invention is to provide a water-resistant polarizing film having optical properties which are not easily deteriorated even at high temperature and high humidity, and a process for producing the film.

The inventors have made eager researches about causes for a deterioration in optical properties of conventional polarizing films at high temperature and high humidity. In the course of the researches, the inventors have paid attention to a matter that in any conventional polarizing film, only one organic nitrogen compound having two or more nitrogen atoms in the molecule thereof is used as a forming-material of the film. The inventors have then found out that the above-mentioned object can be attained by use of two or more organic nitrogen compounds different from each other in the distance between nitrogen atoms therein.

A water-resistant polarizing film of the present invention comprises an organic colorant having an anionic group, and organic nitrogen compounds. The organic nitrogen compounds include a first organic nitrogen compound having at least two nitrogen atoms in the molecule thereof, and a second organic nitrogen compound having at least two nitrogen atoms in the molecule thereof. The distance (A) between adjacent nitrogen atoms in the first organic nitrogen compound is shorter than the distance (B) between adjacent nitrogen atoms in the second organic nitrogen compound.

About the water-resistant polarizing film of the present invention, optical properties thereof are not easily deteriorated even when the film is kept at high temperature and high humidity. It is presumed that this is based on a mechanism as described in the following:

The first organic nitrogen compound, wherein the distance between the adjacent nitrogen atoms is relatively short, causes the organic colorant that are present relatively near to each other to be crosslinked with each other. In contrast, the second organic nitrogen compound, wherein the distance between the adjacent nitrogen atoms is relatively long, causes the organic colorant that are present relatively distantly from each other to be crosslinked with each other. For this reason, when the first and second organic nitrogen compounds, which are different from each other in adjacent-nitrogen-atom-interval distance, are used to crosslink the organic colorant, the orientation of the organic colorant is less disturbed than when only one organic nitrogen compound is used. Thus, in the water-resistant polarizing film of the present invention, optical properties thereof are hardly changed at high temperature and high humidity.

In a preferable water-resistant polarizing film of the present invention, the first organic nitrogen compound and the second organic nitrogen compound are each a noncyclic compound.

In a preferable water-resistant polarizing film of the present invention, the ratio of the distance (A) between the nitrogen atoms in the first organic nitrogen compound to the distance (B) between the nitrogen atoms in the second organic nitrogen compound, A/B, is 0.10 to 0.99.

In a preferable water-resistant polarizing film of the present invention, the distance (A) between the nitrogen atoms in the first organic nitrogen compound is 0.30 to 0.70 nm and the distance (B) between the nitrogen atoms in the second organic nitrogen compound is 0.71 to 1.80 nm.

In a preferable water-resistant polarizing film of the present invention, the first organic nitrogen compound is included at least in an equal amount of the second organic nitrogen compound.

In a preferable water-resistant polarizing film of the present invention, the ratio of the content ($W_1$) by mass of the first organic nitrogen compound to the content ($W_2$) by mass of the second organic nitrogen compound therein, $W_1/W_2$, is 5:5 to 9.5:0.5.

In a preferable water-resistant polarizing film of the present invention, the first organic nitrogen compound and the second organic nitrogen compound each have 2 to 5 nitrogen atoms in the molecule thereof.

In a preferable water-resistant polarizing film of the present invention, the nitrogen atoms are contained in a cationic group.

In a preferable water-resistant polarizing film of the present invention, the cationic group is an amino group or a salt thereof.

In a preferable water-resistant polarizing film of the present invention, the first and second organic nitrogen compounds have the cationic group or salts thereof at each of both molecular terminals of the compounds.

In a preferable water-resistant polarizing film of the present invention, the first organic nitrogen compound and the second organic nitrogen compound each are at least one independently selected from aliphatic diamines or salts thereof, aliphatic triamines or salts thereof, and aliphatic ether diamines or salts thereof.

In another aspect of the present invention, a process for producing a water-resistant polarizing film is provided.

The process for producing a water-resistant polarizing film of the present invention comprises a step of bringing a water-resisting treatment liquid which contains organic nitrogen compounds into contact with at least one surface of a polarizing film containing an organic colorant having an anionic group. The organic nitrogen compounds include a first organic nitrogen compound having at least two nitrogen atoms in the molecule thereof, and a second organic nitrogen compound having at least two nitrogen atoms in the molecule thereof. The distance (A) between the nitrogen atoms in the first organic nitrogen compound is different from the distance (B) between the nitrogen atoms in the second organic nitrogen compound.

In another aspect of the present invention, an image display device is provided.

The image display device of the present invention has any one of the water-resistant polarizing films as described above.

About the water-resistant polarizing film of the present invention, optical properties thereof are not easily deteriorated even at high temperature and high humidity. When the water-resistant polarizing film of the present invention, which is excellent in endurance as described herein, is integrated into, for example, an image display device, an image display device having a display performance not changed over a long term can be provided.

According to the process for producing the present invention, a water-resistant polarizing film having optical properties which are not easily deteriorated can be yielded by conducting a simple step of bringing a specified water-resisting treatment liquid into contact with at least one surface of a polarizing film.

BRIEF DESCRIPTION OF THE DRAWINGS

FIG. 1 is a graph of a variation in each of the transmittance and the degree of polarization of each of polarizing films of Examples and Comparative Examples after each of a heating test and a humidifying test.

DESCRIPTION OF EMBODIMENTS

The water-resistant polarizing film of the present invention includes at least an organic colorant having an anionic ion, a first organic nitrogen compound having two or more nitrogen atoms in the molecule thereof, and a second organic nitrogen compound having two or more nitrogen atoms in the molecule thereof. The first organic nitrogen compound and the second organic nitrogen compound are relatively different from each other in the distance between adjacent nitrogen atoms in the molecule thereof. For example, the first organic nitrogen compound is a compound wherein the distance (A) between adjacent nitrogen atoms in the molecule thereof is shorter than the distance (B) between adjacent nitrogen atoms in the molecule of the second organic nitrogen compound.

In the present specification, "an organic nitrogen compound" means an organic compound having one or more nitrogen atoms in the molecule thereof.

The first organic nitrogen compound and the second organic nitrogen compound are different from each other in the distance between adjacent nitrogen atoms in the molecule thereof. For the sake of the convenience, a compound wherein the distance between the adjacent nitrogen atoms is relatively shorter is referred to as the "first organic nitrogen compound". However, the prefix "first" or "second" is attached in order to distinguish the organic nitrogen compounds from each other, and does not mean superiority or inferiority in the nature of any one of the compounds, largeness or smallness in the blend amount thereof, and the like.

In the present specification, the symbol "A to B" means "A or more and B or less".

[Water-Resistant Polarizing Film]
(Organic Colorant Having Anionic Group)

The organic colorant of the present invention is an organic compound which can be a polarizing film exhibiting absorptive dichroism. The polarizing film is an optical film having a function of transpiring a specific linearly polarized light from natural light or a polarized light.

The organic colorant having an anionic group is not particularly limited as far as it is an organic compound which exhibits absorptive dichroism.

The anionic group has a fixed anionic group bonded to the skeleton of the organic colorant. Usually, a counter ion is bonded to the fixed anionic group. The organic colorant is in an electrically stable state by the bonding of the counter ion thereto.

A partial amount or the total amount of the counter ion is substituted with cationic species of the organic nitrogen compounds having two or more nitrogen atoms.

Examples of the anionic group include a sulfonic acid group, a carboxylic group, a phosphoric group, and a salt thereof. The anionic group is preferably a sulfonic acid group or a sulfonate (—$SO_3M$ group) and more preferably a sulfonate. Here, M represents a counterion.

The number of anionic group (substitution number) is not particularly limited, but preferably two or more, more preferably 2 to 5, and further preferably 2 to 4.

The organic colorant having two or more anionic groups is high in affinity with any aqueous solvent. Thus, the organic colorant can be dissolved in an aqueous solvent, so that a good coating liquid can easily be prepared. The use of this coating solution makes it possible to yield a polarizing film.

It appears that when the water-resisting treatment is conducted, the two or more anionic groups have an effect of forming plural crosslinking points onto the organic nitrogen compounds, which each have two or more nitrogen atoms. For this reason, the organic colorant having two or more anionic groups can form strong supermolecules, the orientation of which is not easily disturbed. The use of the organic colorant having two or more anionic groups makes it possible to yield a polarizing film excellent in endurance.

Examples of the organic colorant include compounds described in JP-A-2007-126628, JP-A-2006-323377, and the like.

The organic colorant preferably has an aromatic ring in the molecule thereof. When the organic colorant has two or more anionic groups, it is preferable that the individual anionic groups are not adjacent in position to each other (are not at any ortho-position). In particular, the individual anionic groups are more preferably at one or more meta-positions. An organic colorant having the anionic groups located at one or more meta-positions is small in steric hindrance between the anionic groups. For this reason, before and after the water-resisting treatment, the organic colorant is oriented in a linear form, thereby making it possible to yield a water-resistant polarizing film high in the degree of polarization.

The organic colorant is, for example, preferably an azo compound represented by the following general formula (I) or (II).

[chemical formula 1]

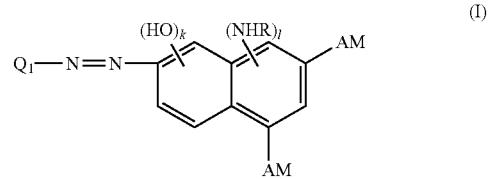

-continued

[chemical formula 2]

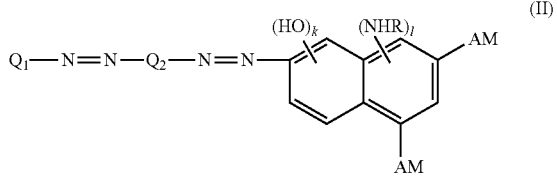

In the general formulae (I) and (II), $Q_1$ represents a substituted or unsubstituted aryl group, $Q_2$ represents a substituted or unsubstituted arylene group, A represents an anionic group, M represents a counterion of the anionic group, R represents a hydrogen atom, a substituted or unsubstituted alkyl group having 1 to 3 carbon atoms, a substituted or unsubstituted acetyl group, a substituted or unsubstituted benzoyl group, or a substituted or unsubstituted phenyl group, k represents an integer of 0 to 4, and l represents an integer of 0 to 4. Here, k+l≦5. In the present specification, the wording "substituted or unsubstituted" means that "a certain group is substituted with a substituent, or is not substituted with any substituent".

The azo compound represented by the general formula (I) or (II) has in the molecule thereof two or more anionic groups, and the two anionic groups (A in the formula) of the naphthyl group are bonded so as to be located at a meta-position.

The aryl group or arylene group represented by $Q_1$ or $Q_2$ may have a substituent or no substituent. In each case whether the aryl group or the arylene group represented by $Q_1$ or $Q_2$ is substituted or not substituted, the azo compound represented by the general formula (I) or (II) exhibits absorptive dichroism.

In the case where the aryl group or the arylene group has a substituent, the substituent is, for example, a halogeno group, a nitro group, a cyano group, a dihydroxy propyl group, a phenyl amino group, —OM, —COOM, —$SO_3M$, an alkyl group having 1 to 6 carbon atoms, an alkoxy group having 1 to 6 carbon atoms, an alkyl amino group having 1 to 6 carbon atoms, an acyl amino group having 1 to 6 carbon atoms, and the like. The substituent is preferably an anionic group such as a nitro group or a —$SO_3M$ group. Here, M represents a counterion.

When the alkyl group having 1 to 3 carbon atoms, benzoyl group or phenyl group represented by R in each of the general formulae (I) and (II) has a substituent, examples of the substituent include the same substituents as given as examples in the description column of the aryl group.

As examples of the aryl group, a condensed ring group where a benzene ring is condensed, such as a naphthyl group, can be cited, in addition to a phenyl group.

As examples of the arylene group, a condensed ring group where a benzene ring is condensed, such as a naphthylene group, can be cited, in addition to a phenylene group.

$Q_1$ in the general formulae (I) and (II) is preferably a substituted or unsubstituted phenyl group and more preferably a phenyl group having a substituent at a para-position.

$Q_2$ in the general formula (II) is preferably a substituted or unsubstituted naphthylene group and more preferably a substituted or unsubstituted 1,4-naphthylene group.

A in the general formulae (I) and (II) is, for example, a sulfonic acid group, a carboxyl group, a phosphate group, or a salt thereof. The A is preferably a sulfonic acid group or a sulfonate and more preferably a sulfonate.

M in the general formulae (I) and (II) is a hydrogen ion, an alkali metal ion, an alkaline earth metal ion, a metal ion other than the alkali metal ion and the alkaline earth metal ion, or a substituted or unsubstituted ammonium ion. After the polarizing film containing the azo compound represented by the general formula (I) or (II) is subjected to a water-resisting treatment, a partial amount or the total amount of M in the general formula (I) or (II) turns to cationic species originating from the organic nitrogen compounds.

R in the general formulae (I) and (II) is preferably a hydrogen atom or a substituted or unsubstituted alkyl group having 1 to 3 carbon atoms, and preferably a hydrogen atom.

Furthermore, k in the general formulae (I) and (II) is preferably an integer of 0 to 2 and more preferably an integer of 0 to 1. In the general formulae (I) and (II), l is preferably an integer of 0 to 2 and more preferably an integer of 0 to 1.

The organic colorant is more preferably an azo compound represented by the following general formula (III).

[chemical formula 3]

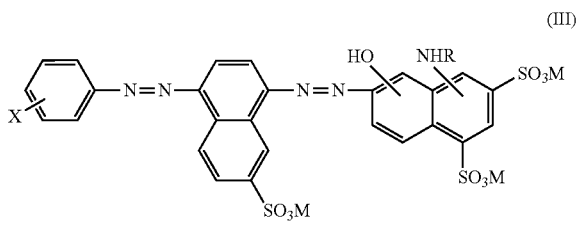

In the general formula (III), X represents a hydrogen atom, a halogen atom, a nitro group, a cyano group, a substituted or unsubstituted alkyl group having 1 to 4 carbon atoms, a substituted or unsubstituted alkoxy group having 1 to 4 carbon atoms, or a —$SO_3M$ group.

R and M in the general formula (III) are identical with R and M in the general formula (I), respectively.

When the alkyl group having 1 to 4 carbon atoms or the alkoxy group having 1 to 4 carbon atoms represented by X in the general formula (III) has a substituent, examples of the substituent include the same substituents as given as examples in the description column of the aryl group.

X in the general formula (III) is preferably a hydrogen atom, a nitro group, or a cyano group, and more preferably a nitro group.

The organic colorant such as the above-described azo compound exhibits a liquid crystallinity (lyotropic liquid crystallinity) in a state where the colorant is dissolved in a solvent. Specifically, the organic colorant such as the azo compound forms supermolecules when the organic colorant is dissolved in the solvent. When a liquid containing the organic colorant flows and spreads in a predetermined direction, shearing stress is applied to the supermolecules. As a result, a coating film where the long axes of the supermolecules are oriented in the direction in which the liquid flows and spreads can be formed. The obtained coating film exhibits excellent absorptive dichroism since the organic colorant is oriented in the predetermined direction.

In particular, in the azo compound represented by the general formula (III), the two or more —$SO_3M$ groups are not adjacent to each other. Thus, in the azo compound, the —$SO_3M$ groups are small in steric hindrance to each other. For this reason, before and after the water-resisting treatment, the azo compound is oriented in a linear form, thereby making it possible to yield a water-resistant polarizing film high in the degree of polarization.

The azo compounds represented by the general formulae (I) to (III) can be obtained by, for example, the following method. Firstly, a monoazo compound is obtained through diazotization and coupling reaction between an aniline derivative and a naphthalene sulfonic acid derivative by a usual method. Secondly, the monoazo compound is diazotized, and after that, a coupling reaction is induced with an aminonaphthol disulfonic acid derivative.

(Organic Nitrogen Compound)

The water-resistant polarizing film of the present invention at least contains a first organic nitrogen compound and a second organic nitrogen compound as an organic nitrogen compound. The first organic nitrogen compound is a compound where the distance (A) between adjacent nitrogen atoms in the molecule thereof is shorter than the distance (B) between adjacent nitrogen atoms in the second organic nitrogen compound.

The first and second organic nitrogen compounds are not particularly limited as far as each of the compounds has two or more nitrogen atoms in the molecule thereof.

The number of the nitrogen atoms contained in each of the first and second organic nitrogen compounds is not particularly limited, but preferably 2 to 5, more preferably 2 or 3, and further preferably 2. If the number of the nitrogen atoms contained in the organic nitrogen compound is more than 5, it is feared that crosslinking points between the compound and the anionic group of the organic colorant become excessively complicated. If the crosslinking points become excessively complicated, the orientation of the organic colorant is disturbed so that optical properties of the polarizing film may be deteriorated. In contrast, if the number of the nitrogen atoms in the organic nitrogen compound is in the above-mentioned range, crosslinking points between the compound and the organic colorant do not become excessively complicated. Thus, the orientation is not disturbed so that the organic colorant can be strongly crosslinked.

Furthermore, the first and second organic nitrogen compounds may have two or more cationic groups in the molecule thereof. The cationic group preferably contains a nitrogen atom. The first and second organic nitrogen compounds preferably have the cationic groups at least at each of both molecular terminals thereof (for example, both terminals of main chain of the molecule).

The cationic group is, for example, an amino group, a guanidino group, an imino group, an ammonium group, and a salt thereof. Examples of the salts include inorganic acid salts such as a hydrochloride, a hydrosulfate, a phosphate, and the like; organic acid salts such as acetic acid, formic acid, and oxalic acid, and the like. The cationic acid is preferably an amino group or a salt thereof.

Each of the first and second organic nitrogen compounds preferably has 2 to 5 amino groups or salts thereof, more preferably has two or three amino groups or salts thereof, and further preferably two amino groups or salts thereof.

The amino group is represented by $-NH_2$, $-NHR^1$, $-NHR^2$, or $-NR^1R^2$. Preferably, $R^1$ and $R^2$ are each independently a substituted or unsubstituted alkyl group, or a halogen. The alkyl group preferably has 4 or less carbon atoms and more preferably has 2 or less carbon atoms. Examples of the amino group include methylamino group, ethylamino group, propylamino group, dimethylamino group, and the like.

Preferably, the first organic compound and the second organic nitrogen compound are each a noncyclic compound. When the organic nitrogen compounds are each a noncyclic compound, the compounds make it possible to crosslink the organic colorant without disturbing the orientation of the organic colorant more largely when the organic nitrogen compounds are each a cyclic compound. This matter can originate from a matter that the cyclic compound is bulky and rigid while the noncyclic compounds are flexible. Accordingly, by use of the noncyclic organic nitrogen compounds, a water-resistant polarizing film better in mechanical strength can be yielded, and further the generation of defects such as a crack can be prevented in the water-resistant polarizing film.

The noncyclic organic nitrogen compound is particular preferably a noncyclic aliphatic nitrogen compound since the noncyclic aliphatic nitrogen compound is excellent in flexibility.

Examples of the noncyclic organic nitrogen compound (noncyclic aliphatic nitrogen compound) include aliphatic diamines such as an alkylene diamine or salts thereof; aliphatic triamines such as an alkylene triamine or salts thereof; aliphatic tetraamines such as an alkylene tetraamine or salts thereof; aliphatic pentaamines such as an alkylene pentaamine or salts thereof; aliphatic ether diamines such as an alkylene ether diamine or salts thereof; and the like. These noncyclic organic nitrogen compounds preferably have 2 to 8 carbon atoms.

Preferably, the first organic nitrogen compound and the second organic nitrogen compound are each independently at least one selected from aliphatic diamines or salts thereof, aliphatic triamines or salts thereof, and aliphatic ether diamines or salts thereof. Each of these aliphatic diamines preferably has an amino group or a salt thereof at both terminals of main chain the molecule.

The noncyclic organic nitrogen compound may be linear or branched, and is preferably linear. By use of the linear organic nitrogen compound, a water-resistant polarizing film which is further excellent in mechanical strength can be obtained.

Examples of the linear aliphatic diamine include 1,2-ethylenediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, and the like. Among them, linear alkylenediamines having 2 to 8 carbon atoms such as 1,3-propanediamine, 1,4-butanediamine, 1,5-pentanediamine, 1,6-hexanediamine, 1,7-heptanediamine, and the like are preferably used.

Examples of the branched aliphatic diamines include 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4butanediamine, 2,3-dimethyl-1,4-butanediamine, 2-methyl-1,5-pentanediamine, 3-methyl-1,5-pentanediamine, and the like.

Examples of the triamines include bis(hexamethylene)triamine, diethylenetriamine, dipropylenetriamine, 1,2,4-butanetriamine, 1,2,5-pentanetriamine, 1,3,5-pentanetriamine, 1,2,6-hexanetriamine, 1,4,7-heptanetriamine, and the like.

Examples of the aliphatic tetraamines include, triethylenetetramine, tetraethylenetetramine, and the like.

Examples of the pentaneamine include tetraethylenepentamine and the like.

Examples of the linear aliphatic ether diamine having 2 to 8 carbon atoms include 2,2'-oxybis(ethylamine), 3,3'-oxybis(propylamine), 1,2-bis(2-aminoethoxy)ethane, and the like.

The distance between the adjacent nitrogen atoms in each of the first and second organic nitrogen compounds is not particularly limited.

The distance (A) between adjacent nitrogen atoms in the first organic nitrogen compound is preferably 0.30 to 0.70 nm and more preferably 0.40 to 0.60 nm. On the other hand, the distance between the adjacent nitrogen atoms in the second organic nitrogen compound is preferably 0.71 to 1.80 nm and more preferably 0.80 to 1.20 nm. The use of first and second organic nitrogen compounds having such nitrogen-atom-interval distances (A) and (B) makes it possible to crosslink molecules of the organic colorant that are present relatively near to each other with each other, and further crosslink molecules of the organic colorant that are present relatively distantly from each other with each other.

In the present specification, the "distance between adjacent nitrogen atoms", which may be referred to as the "adjacent-nitrogen-atom-interval distance", means that the following in a steric molecule: the linear distance from one of the two nitrogen atoms to the other nitrogen atom. In the case of an organic nitrogen compound having three or more nitrogen atoms, the number of intervals between adjacent nitrogen atoms is 2 or more; in this case, the smallest value out of the respective distances of the two or more intervals is defined as the "distance between adjacent nitrogen atoms".

As shown in, for example, the formula (A) illustrated below, the distance between nitrogen atoms in 1,3-propanediamine is d1. The distance d1 is the linear distance between the nitrogen atoms when the molecule is in a sterically stable state.

As shown in the formula (B) illustrated below, the number of intervals between adjacent nitrogen atoms in 1,2,5-pentanetriamine is two. The distance of a first of the adjacent-nitrogen-atom-interval is d2, and that of a second thereof is d3. The distances d2 and d3 are each the linear distance between the nitrogen atoms when the molecule is in a sterically stable state. In the present invention, the adjacent-nitrogen-atom-interval distance of 1,2,5-pentanetriamine corresponds to the distance d2.

[chemical formula 4]

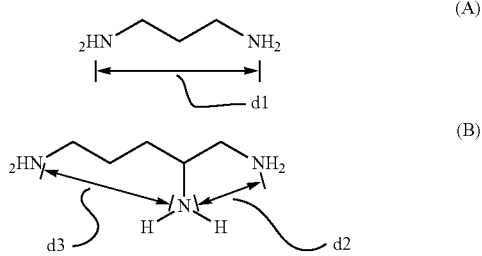

Distances between adjacent nitrogen atoms of some organic nitrogen compounds are listed in the following Table 1.

TABLE 1

| noncyclic organic nitrogen compound | distance between nitrogen atoms (nm) | number of atoms between nitrogen atoms |
|---|---|---|
| 1,2-ethylenediamine | 0.38 | 2 |
| 1,3-propanediamine | 0.50 | 3 |
| 1,4-butanediamine | 0.63 | 4 |
| 1,5-pentanediamine | 0.75 | 5 |
| 1,6-hexanediamine | 0.88 | 6 |
| 1,7-heptanediamine | 1.00 | 7 |
| 1,8-octanediamine | 1.13 | 8 |
| 1,9-nonanediamine | 1.26 | 9 |
| 1,10-decanediamine | 1.39 | 10 |
| 1,11-undecanediamine | 1.51 | 11 |
| 1,12-dodecanediamine | 1.64 | 12 |

TABLE 1-continued

| noncyclic organic nitrogen compound | distance between nitrogen atoms (nm) | number of atoms between nitrogen atoms |
|---|---|---|
| 2,2'-oxybis(ethylamine) | 0.73 | 5 |
| bis(hexamethylene)triamine | 0.88 | 6 |

The difference between the adjacent-nitrogen-atom-interval distance (A) of the first organic nitrogen compound and the adjacent-nitrogen-atom-interval distance (B) of the second organic nitrogen compound, B-A, is preferably 0.05 to 1.5 nm, more preferably 0.1 to 1.0 nm, and further preferably 0.2 to 0.8 nm.

The ratio of the adjacent-nitrogen-atom-interval distance (A) of the first organic nitrogen compound to the adjacent-nitrogen-atom-interval distance (B) of the second organic nitrogen compound, A/B, is not particularly limited, but preferably 0.10 to 0.99 and more preferably 0.50 to 0.70.

The use of the first and second organic nitrogen compounds to set the distance difference (B-A) and/or the distance ratio (A/B) into the range makes it possible to crosslink the organic colorants that are relatively near to each other with each other, and further crosslink the organic colorants that are relatively distantly from each other with each other. For this reason, supermolecules wherein the organic colorant molecules are crosslinked with each other into a network form can be formed.

For example, at least one kind of the first organic nitrogen compound selected from 1,2-ethylene diamine, 1,3-propanediamine, and 1,4-butanediamine is used. Also, at least one kind of the second organic nitrogen compound selected form 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 2,2'-oxybis(ethylamine), and bis(hexamethylene)triamine is used. Such first and second organic nitrogen compounds are preferable since the compounds satisfy the above-mentioned nitrogen-atom-interval-distances and are each a noncyclic compound in a linear form.

(Composition and Various Properties of Water-Resistant Polarizing Film)

The content of the organic colorant in the water-resistant polarizing film of the present invention is not particularly limited, but preferably 80% by mass or more and less than 100% by mass and more preferably 90% by mass or more and less than 100% by mass with respect to total mass of the polarizing film.

The total content of the first and second organic nitrogen compounds in the water-resistant polarizing film of the present invention is preferably more than 0 and 20% by mass or less and more preferably 1 to 10% by mass with respect to total mass of the polarizing film.

The each of contained accounts of the first and second organic nitrogen compounds in the water-resistant polarizing film of the present invention is not particularly limited. It is however preferable that the first organic nitrogen compound is contained in a content by mass identical with or more than the content by mass of the second organic nitrogen compound. For example, the ratio of the content ($W_1$) by mass of the first organic nitrogen compound to the content ($W_2$) by mass of the second organic nitrogen compound therein, $W_1/W_2$, is preferably 5:5 to 9.5:0.5 and more preferably 7:3 to 9:1.

It is presumed that the first organic nitrogen compound has an effect of crosslinking the molecules of the organic colorant that are relatively near to each other with each other to harden the supermolecules of the organic colorant strongly. On the other hand, it is presumed that the second organic nitrogen compound has an effect of crosslinking the molecules of the organic colorant that are relatively distinctly from each other with each other to supplement the bond of the supermolecules of the organic colorant molecules crosslinked by the first organic nitrogen compound. Thus, when the first organic nitrogen compound is blended in a large proportion, stronger supermolecules of the organic colorant can be formed.

The water-resistant polarizing film of the present invention may contain other nitrogen compound different from the first and second organic nitrogen compounds.

The other organic nitrogen compound may be an organic nitrogen compound having two or more nitrogen atoms, or an organic nitrogen compound having one nitrogen atom. The other organic nitrogen compound is preferably a noncyclic organic nitrogen compound having two or more nitrogen atoms as well as the first and second organic nitrogen compounds.

The water-resistant polarizing film of the present invention may contain other component different from the organic colorant and the organic nitrogen compound as far as the effect of the present invention does not deteriorate.

Examples of the other component include other organic colorant (an organic colorant different from an organic colorant having an anionic group), a various additive, an optionally liquid crystalline compound, a polymer, and the like.

The water-resistant polarizing film of the present invention exhibits absorptive dichroism at least at partial wavelengths in the visible ray range (wavelengths: 380 to 780 nm).

The transmittance of the water-resistant polarizing film is 35% or more, preferably 36% or more, and more preferably 37% or more.

The degree of polarization of the water-resistant polarizing film is 95% or more and preferably 98% or more.

The thickness of the water-resistant polarizing film is not particularly limited, but preferably 0.1 to 10 µm. If the thickness of the water-resistant polarizing film is less than 1 µm, the film may be used in the state of being laminated onto a substrate in order to maintain a film shape.

The optical properties of water-resistant polarizing film of the present invention are not easily deteriorated even when the film is kept at high temperature and high humidity. It is presumed that this is based on a mechanism as described in the following:

In general, about the organic colorant, a molecule thereof is arranged to be apart from adjacent molecules of the organic colorant with a predetermined interval, and oriented in a direction substantially identical with the direction of the adjacent molecules. By fixing the oriented organic colorant molecules, a polarizing film is yielded. At this time, a crosslinking agent is bonded to the anionic groups of the oriented organic colorants, so as to make the organic colorants into a supermolecule form (into a giant form), whereby a polarizing film excellent in water resistance is yielded. By use of two or more kinds of organic nitrogen compounds different from each other in the distance between nitrogen atoms therein (the first and second organic nitrogen compounds) as a cross-linking agent, strong supermolecules of the organic colorant may be formed. Specifically, the first organic nitrogen compound, wherein the distance between the adjacent nitrogen atoms is relatively short, causes the organic colorants that are present relatively near to each other to be crosslinked with each other. In contrast, the second organic nitrogen compound, wherein the distance between the adjacent nitrogen atoms is relatively long, causes the organic colorants that are present relatively distantly from each other to be crosslinked with each other. By bonds between each of two or more kinds of organic nitrogen compounds and the organic colorant, supermolecules wherein the organic colorant molecules are crosslinked with each other into a network form can be formed. For this reason, in the case where the first and second organic nitrogen compounds are used to crosslink the organic colorant, the orientation of the organic colorant is less disturbed than when only one organic nitrogen compound is used to crosslink the organic colorant. Because of this mechanism, it is presumed that optical properties of the water-resistant polarizing film of the present invention are hardly changed at high temperature and high humidity.

[Process for Producing Water-Resistant Polarizing Film]

For example, the water-resistant polarizing film of the present invention can be produced by the following step A to step C. Furthermore, the following step D may be conducted after the step C.

step A: a step of forming a coating film containing an organic colorant by applying a coating liquid containing the organic colorant having an anionic group on a substrate step B: a step of yielding a polarizing film by drying the coating film formed in the step A.

step C: a step of bringing a single surface or both surfaces of the polarizing film yielded in the step B into contact with a water-resisting treatment liquid, which contains organic nitrogen compounds.

(Water-Resistant Treatment).

step D: a step of causing the polarizing film to undergo washing and/or some other treatment in order to remove an excess of the water-resisting treatment liquid, which adheres onto the polarizing film.

(Step A)

In the step A, a coating liquid containing an organic colorant is applied on a substrate to form a coating film.

Examples of the organic colorant include the colorants as exemplified above, and the azo compound represented by the general formula (III) is preferably used.

The coating liquid can be prepared by dissolving the organic colorant in an appropriate solvent.

The organic colorant in the coating liquid forms supermolecules in the liquid. As a result, the coating liquid exhibits a liquid crystal phase. The liquid crystal phase is not particularly limited, and examples of the liquid crystal phase include a nematic liquid crystal phase, a middle phase, a smectic liquid crystal phase, a cholesteric liquid crystal phase, a hexagonal liquid crystal phase, and the like. The liquid crystal phase can be identified and confirmed from an optical pattern when observed by using a polarization microscope.

The solvent is not particularly limited and a conventionally known one can be used. The solvent which can dissolve the organic colorant satisfactorily is preferably used. In the case of using the coating liquid wherein the organic colorant is satisfactorily dissolved, the organic colorant does not precipitate easily when the coating liquid is applied into a film form onto a substrate. Accordingly, a polarizing film excellent in transmittance can be yielded.

For example, the solvent, which can dissolve the organic colorant satisfactorily, is for example, an aqueous solvent.

Examples of the aqueous solvent include water, a hydrophilic solvent, and a mixed solvent containing water and the hydrophilic solvent. The hydrophilic solvent is a solvent, which can be dissolved with water uniformly.

Examples of the hydrophilic solvent include, for example, alcohols such as methanol, ethanol, methyl alcohol, isopropyl alcohol, and the like; glycols such as ethylene glycol, diethylene glycol, and the like; cellosolves such as methyl cellosolve, ethyl cellosolve, and the like; ketones such as acetone, methyl ethyl ketone, and the like; esters such as acetic ether and the like. Preferably, the solvent is water or the mixed solvent containing water and the hydrophilic solvent.

The concentration of the organic colorant in the coating liquid is preferably prepared so as to exhibit a liquid crystal phase. Specifically, the concentration of the organic colorant is preferably 0.5 to 50% by mass. In the partial range of this concentration, the coating liquid may exhibit a liquid crystal phase.

In addition, the pH of the coating liquid is preferably prepared about pH 4 to 10 and more preferably about pH 6 to 8.

Further, an additive may be added to the coating liquid. Examples of the additive include, for example, a plasticizer, a heat stabilizer, a light stabilizer, a lubricant, an antioxidant, an ultraviolet absorber, a flame retardant, a coloring agent, an antistatic agent, an antifungus agent, a compatibilizing agent, a cross-linking agent, a thickening agent, and the like. When an additive is added in the coating liquid, the concentration of the additive in the coating liquid is preferably more than 0 and 10% by mass or less. A surfactant may be added to the coating liquid. The surfactant is used for improving the wettability and the application property of the coating liquid onto a surface of a substrate. As the surfactant, a nonionic surfactant is preferably used. The concentration of the surfactant is preferably more than 0 and 5% by mass or less.

The coating film may be formed by applying the coating liquid on an appropriate substrate.

The substrate is used for uniformly developing of the coating liquid. The type of the substrate is not particularly limited as far as it is proper to the object. Examples of the substrate include a polymer film, a glass plate, and the like.

In a preferable embodiment, a single polymer film is used as the substrate. In other preferable embodiment, a laminated body containing a polymer film is used as the substrate. The substrate more preferably has an orientation layer. Examples of the substrate having the orientation layer include a polymer film having an orientation layer.

The polymer film is not particularly limited, but preferably a film excellent in transparency (for example, having a haze value of 5% or less).

The thickness of the substrate can be suitably designed in accordance with the strength and the like. However, in terms of thickness reduction and weight reduction, the thickness of the substrate is preferably 300 µm or less, more preferably 5 to 200 µm, and particularly preferably 10 to 100 µm.

In the case where the substrate has an orientation layer, this orientation layer may be formed by subjecting an orientation treatment to a surface of the substrate. Examples of the orientation treatment include a mechanical orientation treatment such as a rubbing treatment, a chemical orientation treatment such as an optical orientation treatment, and the like.

The coating liquid is applied on the substrate (preferably, on the orientation layer of the substrate).

In the case where hydrophilicity of a coating surface (a surface where the coating liquid is applied) is low, a hydrophilization treatment is preferably subjected to the coating surface.

The hydrophilization treatment may be a dry treatment or a wet treatment. Examples of the dry treatment include discharge treatments such as a corona treatment, a plasma treatment, a glow discharge treatment, and the like; a flame treatment; an ozone treatment; an UV ozone treatment; and ionization active ray treatments such as an ultraviolet treatment, an election beam treatment, and the like. Examples of the wet treatment include an ultrasonic treatment using a solvent such as water or acetone, an alkali treatment, or an anchor coat treatment. These treatments may be conducted alone or in combination of two or more thereof.

For example, as an applying method of the coating liquid, an applying method using a suitable coater may be adopted. Examples of the coater include a bar coater, a reverse roll coater, a positive rotation roll coater, a gravure coater, a rod coater, a slot die coater, a slot orifice coater, a curtain coater, a fountain coater, and the like.

When the coating liquid in such a state as to exhibit a liquid crystal phase is coated, shearing stress is applied to the organic colorant in a process where the coating liquid flows. As a result, a coating film where the organic colorant is oriented in a predetermined direction may be formed.

The organic colorant aligns by the shearing stress applied to the coating liquid when it flows. In addition to or alternative to this method, the organic colorant may be oriented by other method.

Examples of the other method include a method a method of applying the coating liquid on a substrate which is subjected to an orientation treatment, a method of applying a magnetic field or an electrical field after the formation of a coating film by applying the coating liquid on a substrate, and the like. If these other methods are conducted singly, the coating film wherein the organic colorant is oriented in a predetermined direction may be formed.

(Step B)

The step B is a step of drying the coating film formed in the step A.

The drying may be natural drying, forcible drying, and the like. Examples of the forcible drying include a drying method using an air-circulating constant temperature oven, a heater, a heat pipe roll, or a heated metal belt.

The drying temperature is below or equal to the isotropic phase transition temperature of the coating liquid, and it is preferable to dry the coating film by gradually raising the temperature from low temperature to high temperature. Specifically, the drying temperature is preferably 10 to 80° C. and more preferably 20 to 60° C. Within such a temperature range, a dried coating film having small thickness variation can be obtained.

The drying time can be suitably selected in accordance with the drying temperature and the kind of the solvent. In the case where the natural drying is adopted, the drying time is preferably 1 second to 120 minutes and more preferably 10 seconds to 5 minutes.

The coating film will have a higher concentration in the drying process and the oriented organic colorant will be fixed. An absorption dichroism is generated by fixing the orientation of the organic colorant in the coating film. The dried coating film obtained by the drying process is a polarizing film.

The thickness of the obtained polarizing film (the dried coating film) is preferably 0.1 to 10 µm.

(Step C)

The step C is a step of bringing a water-resisting treatment liquid, which contains the first and second organic nitrogen compounds, into contact with the surface (the surface opposite to the bonded surface of the substrate) of the polarizing film obtained in the step B.

The water-resisting treatment liquid contains the first organic nitrogen compound and the second organic nitrogen compound. The water-resisting treatment liquid may contain other organic nitrogen compound and/or other component as necessary.

The first and second organic nitrogen compounds, the other organic nitrogen compound, and the other component may be appropriately selected from the materials described in detail above; thus, the above-mentioned description should be referred to.

The water-resisting treatment liquid may be prepared by dissolving or dispersing the first and second organic nitrogen compounds, and so on into an appropriate solvent.

The solvent is preferably an aqueous solvent. The aqueous solvent may be any one of the solvents as examples given in the description column of the coating liquid.

The concentration of the first and second organic nitrogen compounds (total amount of the first and second organic nitrogen compounds) in the water-resisting treatment liquid is preferably 3 to 30% by mass and more preferably 5 to 20% by mass.

It is preferable that in the water-resisting treatment liquid, the first organic nitrogen compound is blended in an amount equal to or more than the amount of the second organic nitrogen compound. For example, the blend ratio of the first organic nitrogen compound to the second organic nitrogen compound is preferably 5:5 to 9.5:0.5 and more preferably 7:3 to 9:1.

The water-resisting treatment liquid is brought into contact with a single surface or both surfaces of the polarizing film obtained through the step B, thereby making it possible to obtain a water-resistant polarizing film of the present invention excellent in endurance.

The method for bringing the water-resisting treatment liquid into contact with the polarizing film is not particularly limited. Examples of the contacting method include a method of applying the water-resisting treatment liquid onto the surface of the polarizing film and a method of immersing the polarizing film into the water-resisting treatment liquid. The applying of the water-resisting treatment liquid can be conducted by use of a spray or some other means besides the above-mentioned coater.

When these methods are adopted, it is preferable to wash the surface(s) of the polarizing film with water or any optional solvent, and then dry the workpiece.

The contacting method is preferably the method of immersing the polarizing film into the water-resisting treatment liquid. According to this method, the water-resisting treatment liquid can be certainly brought into contact with the whole of the polarizing film. Additionally, according to this method, the water-resisting treatment liquid penetrates easily into the polarizing film, so that larger amounts of the organic colorant and the organic nitrogen compounds can be crosslinked.

When the water-resisting treatment liquid is brought into contact with the polarizing film, the organic colorants in the polarizing film can be crosslinked with each other through the first and the second organic nitrogen compounds. The crosslinking makes it possible to yield the water-resistant polarizing film of the present invention, which is excellent in water resistance and mechanical strength, and is hardly changed in optical properties thereof at high temperature and high humidity.

(Step D)

The step D is a step of washing and/or drying the surface of the polarizing film after the water-resisting treatment.

The step D is conducted in order to remove an excess of the water-resisting treatment liquid, which adheres onto the water-resistant polarizing film yielded through the step C.

For example, the polarizing film after the water-resisting treatment may be washed with water, and then dried. The polarizing film after the water-resisting treatment may be merely dried.

The process for producing the present invention may further have any step other than the step A to step D.

(Use of Water-Resistant Polarizing Film)

For example, the water-resistant polarizing film of the present invention may be used as a polarizing plate by laminating a protective film on one surface or both surfaces thereof.

In the case where the water-resistant polarizing film is used as the polarizing plate, a birefringent film may be further laminated thereon.

The water-resistant polarizing film obtained by the process for producing the present invention may be used in the state that the water-resistant polarizing film is laminated on the substrate, or in the state that water-resistant polarizing film is peeled off from the substrate.

In the case where the water-resistant polarizing film is used in the state that the water-resistant polarizing film is laminated on the substrate, the substrate may be used as a protective film.

The water-resistant polarizing film of the present invention is preferably mounted on an image display device.

Examples of the image display device having the water-resistant polarizing film of the present invention include a liquid crystal display device, an organic EL display, a plasma display, and the like. The preferable use of the image display device is a TV set.

EXAMPLES

The present invention will be described in detail by way of Examples and Comparative Examples. The invention is not limited only to the following examples. Each of measuring methods used in the Examples and the Comparative Examples is as follows:

[Observation Method of Liquid Crystal Phase]

A small amount of a coating liquid was sandwiched between two glass slides and observed a liquid crystal phase by using a polarization microscope (product name: "OPTIPHOT-POL," manufactured by Olympus Corporation).

[Measurement of Thickness of Polarizing Film]

A portion of the polarizing film was peeled off from a polymer film and a step between the polymer film and the polarizing film was measured by using a three-dimensional non-contact surface form measuring system (product name: "Micromap MM5200," manufactured by Ryoka Systems Inc.).

[Method for Measuring Transmittance and Degree of Polarization of Any Polarizing Film]

A spectrophotometer (product name: "U-4100", manufactured by JASCO Corp.) equipped with a Glan-Thompson polarizer was used, and linearly polarized light having a wavelength of 380 to 780 nm was radiated into any polarizing film. A multiplication of a luminous coefficient was made at each of the wavelengths and then the resultant values were integrated to measure the average values $k_1$ and $k_2$, respectively, in the wavelength range. The values $k_1$ and $k_2$ were substituted for the following equations 1 and 2, thereby calculating the transmittance and the degree of polarization:

the single transmittance $k=(k_1+k_2)/2$, and  Equation 1:

the degree of polarization $=(k_1-k_2)/(k_1+k_2)\times 100$  Equation 2:

In the equations 1 and 2, $k_1$ represents a transmittance of the linearly polarized light in the maximum transmittance direction, and $k_2$ represents a transmittance of the linearly polarized light in the direction perpendicular to the maximum transmittance direction.

[Heating Test Method, and Method for Measuring Variation in Optical Properties]

Before any water-resistant polarizing film was tested, the transmittance and the degree of polarization of the film were measured according to the above-mentioned measuring method.

Next, a laminate composed of the water-resistant polarizing film and the substrate was cut into a piece 5 cm in length and 5 cm in width. The surface of the water-resistant polarizing film (the surface thereof opposite to the substrate-bonded surface thereof) of the laminate was bonded through a transparent pressure-sensitive adhesive (product name: "NO. 7", manufactured by Nitto Denko Corp.) onto a glass plate, and this workpiece was put into a thermostat (product name: "DKN-812", manufactured by Yamato Scientific Co., Ltd.) of 90° C. temperature, and then allowed to stand still for 500 hours. The transmittance and the degree of polarization of the water-resistant polarizing film after the heating test were measured according to the above-mentioned measuring method. The transmittance and the degree of polarization before and after the heating were substituted into the following equations 3 and 4 to calculate $\Delta T_{heat}$ and $\Delta P_{heat}$:

$$\Delta T_{heat} = T_2 - T_1 \quad \text{Equation 3:}$$

and $$\Delta P_{heat} = P_2 - P_1 \quad \text{Equation 4:}$$

In the equations 3 and 4, $\Delta T_{heat}$ represents a variation in the transmittance before and after the heating, and $\Delta P_{heat}$ represents a variation in the degree of polarization before and after the heating. $T_1$ represents a transmittance of the polarizing film before the test, and $T_2$ represents a transmittance of the polarizing film after the heating test. $P_1$ represents a degree of polarization of the polarizing film before the test, and $P_2$ represents a degree of polarization of the polarizing film after the heating test.

[Humidifying Test Method, and Method for Measuring Variation in Optical Properties]

A laminate composed of any water-resistant polarizing film and the substrate was cut into a piece 5 cm in length and 5 cm in width. The surface of the water-resistant polarizing film of the laminate was bonded through a transparent pressure-sensitive adhesive (product name: "NO. 7", manufactured by Nitto Denko Corp.) onto a glass plate, and this workpiece was put into a thermostat (product name: "PH-3KT", manufactured by Espec Corp.) of 60° C. temperature and 90% RH, and then allowed to stand still for 500 hours. The transmittance and the degree of polarization of the water-resistant polarizing film after the humidifying test were measured according to the above-mentioned measuring method. The transmittance and the degree of polarization before and after the humidifying were substituted into the following equations 5 and 6 to calculate $\Delta T_{hum}$ and $\Delta P_{hum}$:

$$\Delta T_{hum} = T_3 - T_1, \text{ and} \quad \text{Equation 5:}$$

$$\Delta P_{hum} = P_3 - P_1 \quad \text{Equation 6:}$$

In the equations 5 and 6, $\Delta T_{hum}$ represents a variation in the transmittance before and after the humidifying, and $\Delta P_{hum}$ represents a variation in the degree of polarization before and after the humidifying. In the same manner as described above, $T_1$ represents a transmittance of the polarizing film before the test. In the same manner as described above, $P_1$ represents a degree of polarization of the polarizing film before the test. $T_3$ represents a transmittance of the polarizing film after the humidifying test, and $P_3$ represents a degree of polarization of the polarizing film after the humidifying test.

[Method for Calculating the Nitrogen-Atom-Interval Distance]

About each organic nitrogen compound, a software, Chem 3D pro (manufactured by Cambridge Soft Co.), was used to calculate out a stabilized state thereof through Minimize Energy by MM2 calculation. On the basis of the structure thereof, MOPAC calculation (Minimize Energy) was made so as to calculate out the stabilized state. The nitrogen-atom-interval distance was calculated out.

Example 1

4-nitroaniline and 8-amino-2-naphthalenesulfonic acid were caused to undergo diazotization and coupling reaction by a usual method (a method described on pages 135 to 152 of "Riron Seizoh, Senryo Kagaku (Theory Production, Dye Chemistry), 5th Version" written by Yutaka Hosoda, and published by Gihodo Shuppan Co., Ltd. on Jul. 15, 1968) to yield a monoazo compound. The resultant monoazo compound was diazotized by the usual method, and further the resultant was caused to undergo a coupling reaction with 1-amino-8-naphthol-2,4-disulfonic acid (lithium salt), thereby yielding a crude product. This was salted out with lithium chloride to yield an azo compound having the following structural formula (IV):

[chemical formula 5]

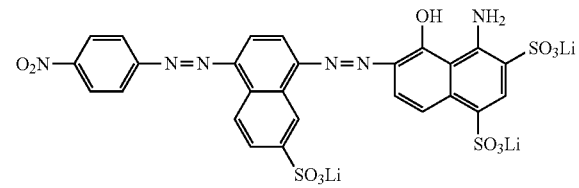

(IV)

The azo compound of the formula (IV) was dissolved into ion exchange water to prepare a 20% by mass of coating liquid. This coating liquid was collected with a plastic syringe (Poly Spuit), and observed at room temperature (23° C.) in accordance with the observation method of the liquid crystal phase. As a result, the coating liquid showed a nematic liquid crystal phase. The pH of this coating liquid was 7.8.

The coating liquid was applied on a norbornene based polymer film (trade name: "ZEONOA" manufactured by Zeon Corporation) subjected to rubbing treatment and corona treatment by using a bar coater (product name: "Mayer rot HS4", manufactured by Bushman Co.). After that, the workpiece was naturally dried sufficiently in a thermostat of 23° C. The dried coating film formed on the substrate by drying was a polarizing film. The thickness of the polarizing film was 0.4 µm.

1,3-propanediamine hydrochloride (manufactured by Tokyo Chemical Industry Co., Ltd., the number of atoms between the nitrogen atoms: 3, and the distance between the nitrogen atoms: 0.50 nm), and 1,7-heptanediamine hydrochloride (manufactured by Tokyo Chemical Industry Co., Ltd., the number of atoms between the nitrogen atoms: 7, and the distance between the nitrogen atoms: 1.0 nm), the ratio by mass of the former to the latter being 80:20, were incorporated into ion exchange water, so as to prepare a 10% by mass of water-resisting treatment liquid.

Next, the laminate composed of the substrate and the polarizing film was immersed in the water-resisting treatment liquid for about 1 minute, and then the laminate was taken out.

The surfaces thereof were washed with water, and then dried. In this way, the laminate was subjected to a water-resisting treatment. This treated polarizing film was a water-resistant polarizing film of Example 1.

This laminate was immersed in water for 1 hour. Thereafter, this was taken out, and then observed. As a result, the water-resistant polarizing film was not dissolved in water.

The water-resistant polarizing film (the water-resistant polarizing film laminated on the substrate) of Example 1 was heated in accordance with the heating test, and then a variation in each of the transmittance thereof and the degree of polarization thereof was obtained. The water-resistant polarizing film of Example 1 was humidified in accordance with the humidifying test, and then a variation in each of the transmittance thereof and the degree of polarization thereof was obtained. The results are shown in Table 2. In FIG. 1 are shown the variation in each of the transmittance and the degree of polarization after the heating test, and the variation in each of the transmittance and the degree of polarization after the humidifying test.

Example 2

A water-resistant polarizing film was produced in the same way as in Example 1 except that the ratio by mass of 1,3-propanediamine hydrochloride to 1,7-heptanediamine hydrochloride was changed to 50:50. Furthermore, in the same way as in Example 1, the film was immersed in water, and then observed. As a result, the water-resistant polarizing film of Example 2 was not dissolved in water.

About the water-resistant polarizing film of Example 2 also, in the same way as in Example 1, a variation in each of the transmittance and the degree of polarization was obtained before and after the heating, and before and after the humidifying. The results are shown in Table 2 and FIG. 1.

Example 3

A water-resistant polarizing film was produced in the same way as in Example 1 except that 1,7-heptanediamine hydrochloride was changed to bis(hexamethylene)triamine hydrochloride (manufactured by Sigma-Aldrich, Inc., the number of atoms between the nitrogen atoms: 6, and the distance between the nitrogen atoms: 0.88 nm). Furthermore, in the same way as in Example 1, the film was immersed in water, and then observed. As a result, the water-resistant-polarizing film of Example 3 was not dissolved in water.

About the water-resistant polarizing film of Example 3 also, in the same way as in Example 1, a variation in each of the transmittance and the degree of polarization was obtained before and after the heating, and before and after the humidifying. The results are shown in Table 2 and FIG. 1.

Example 4

A water-resistant polarizing film was produced in the same way as in Example 1 except that 1,7-heptanediamine hydrochloride was changed to 2,2'-oxybis ethylene diamine hydrochloride (manufactured by Tokyo Chemical Industry Co., Ltd., the number of atoms between the nitrogen atoms: 5, and the distance between the nitrogen atoms: 0.73 nm). Furthermore, in the same way as in Example 1, the film was immersed in water, and then observed. As a result, the water-resistant-polarizing film of Example 4 was not dissolved in water.

About the water-resistant polarizing film of Example 4 also, in the same way as in Example 1, a variation in each of the transmittance and the degree of polarization was obtained before and after the heating, and before and after the humidifying. The results are shown in Table 2 and FIG. 1.

TABLE 2

| | | Example 1 | Example 2 | Example 3 | Example 4 |
|---|---|---|---|---|---|
| water-resisting treatment liquid | first organic nitrogen compound | 1.3-propanediamine | 1.3-propanediamine | 1.3-propanediamine | 1.3-propanediamine |
| | distance between nitrogen atoms(nm) | 0.50 nm | 0.50 nm | 0.50 nm | 0.50 nm |
| | blend amount (part by mass) | 80 | 50 | 80 | 80 |
| | second organic nitrogen compound | 1,7-heptanediamine | 1,7-heptanediamine | bis(hexamethylene) triamine | 2,2'-oxybis (ethylamine) |
| | distance between nitrogen atoms(nm) | 1.0 nm | 1.0 nm | 0.88 nm | 0.73 nm |
| | blend amount (part by mass) | 20 | 50 | 20 | 20 |
| heating test (transmittance) | $T_1$ (%) before heating | 38.3 | 38.6 | 38.7 | 37.9 |
| | $T_2$ (%) after heating | 36.6 | 37.0 | 37.9 | 36.4 |
| | variation $\Delta T_{heat}$ (%) | −1.7 | −1.5 | −0.8 | −1.5 |
| heating test (degree of polarization) | $P_1$ (%) before heating | 98.6 | 98.6 | 98.5 | 98.3 |
| | $P_2$ (%) after heating | 98.2 | 98.1 | 98.2 | 97.7 |
| | variation $\Delta P_{heat}$ (%) | −0.4 | −0.5 | −0.3 | −0.6 |
| humidifying test (transmittance) | $T_1$ (%) before humidifying | 38.3 | 38.6 | 38.7 | 37.9 |
| | $T_3$ (%) after humidifying | 37.6 | 37.8 | 38.4 | 36.7 |
| | variation $\Delta T_{hum}$ (%) | −0.7 | −0.7 | −0.3 | −1.2 |
| humidifying test (degree of polarization) | $P_1$ (%) before humidifying | 98.6 | 98.6 | 98.5 | 98.3 |
| | $P_3$ (%) after heating | 99.0 | 98.5 | 98.9 | 98.6 |
| | variation $\Delta P_{hum}$ (%) | 0.4 | −0.1 | 0.4 | 0.3 |

TABLE 3

|  |  | Comparative Example 1 | Comparative Example 2 | Comparative Example 3 | Comparative Example 4 | Comparative Example 5 |
|---|---|---|---|---|---|---|
| water-resisting treatment liquid | compound | 1.3-propanediamine | 1,7-heptanediamine | bis(hexamethylene)triamine | 2,2'-oxybis(ethylamine) | barium chloride |
|  | distance between nitrogen atoms(nm) | 0.50 nm | 1.0 nm | 0.88 nm | 0.70 nm | — |
|  | blend amount (part by mass) | 100 | 100 | 100 | 100 | 100 |
| heating test (transmittance) | $T_1$ (%) before heating | 38.2 | 37.1 | 38.9 | 37.4 | 34.6 |
|  | $T_2$ (%) after heating | 36.6 | 36.0 | 38.0 | 33.9 | 32.1 |
|  | variation $\Delta T_{heat}$ (%) | −1.6 | −1.1 | −0.9 | −3.5 | −2.5 |
| heating test (degree of polarization) | $P_1$ (%) before heating | 98.5 | 97.8 | 89.3 | 96.0 | 99.5 |
|  | $P_2$ (%) after heating | 97.7 | 97.4 | 89.4 | 95.7 | 95.0 |
|  | variation $\Delta P_{heat}$ (%) | −0.8 | −0.4 | 0.1 | −0.3 | −4.5 |
| humidifying test (transmittance) | $T_1$ (%) before humidifying | 38.2 | 37.1 | 38.9 | 37.4 | 34.6 |
|  | $T_3$ (%) after humidifying | 34.3 | 41.4 | 32.0 | 36.2 | 35.9 |
|  | variation $\Delta T_{hum}$ (%) | −3.9 | 4.3 | −6.9 | −1.2 | 1.3 |
| humidifying test (degree of polarization) | $P_1$ (%) before humidifying | 98.5 | 97.8 | 89.3 | 96.0 | 99.5 |
|  | $P_3$ (%) after heating | 98.6 | 91.9 | 88.5 | 96.2 | 99.4 |
|  | variation $\Delta P_{hum}$ (%) | 0.1 | −5.9 | −0.8 | 0.2 | −0.1 |

Comparative Example 1

A water-resistant polarizing film was produced in the same way as in Example 1 except that instead of the water-resisting treatment liquid in Example 1, use was made of a 10% by mass of water-resisting treatment liquid wherein only 1,3-propanediamine hydrochloride was dissolved in water. Furthermore, in the same way as in Example 1, the film was immersed in water, and then observed. As a result, the water-resistant-polarizing film of Comparative Example 1 was not dissolved in water.

About the water-resistant polarizing film of Comparative Example 1 also, in the same way as in Example 1, a variation in each of the transmittance and the degree of polarization was obtained before and after the heating, and before and after the humidifying. The results are shown in Table 3. In FIG. 1 are shown a variation in each of the transmittance and the degree of polarization after the heating test, and a variation in each of the transmittance and the degree of polarization after the humidifying test.

Comparative Example 2

A water-resistant polarizing film was produced in the same way as in Example 1 except that instead of the water-resisting treatment liquid in Example 1, use was made of a 10% by mass of water-resisting treatment liquid wherein only 1,7-heptane diamine hydrochloride was dissolved in water. Furthermore, in the same way as in Example 1, the film was immersed in water, and then observed. As a result, the water-resistant-polarizing film of Comparative Example 2 was not dissolved in water.

About the water-resistant polarizing film of Comparative Example 2 also, in the same way as in Example 1, a variation in each of the transmittance and the degree of polarization was obtained before and after the heating, and before and after the humidifying. The results are shown in Table 3 and FIG. 1.

Comparative Example 3

A water-resistant polarizing film was produced in the same way as in Example 1 except that instead of the water-resisting treatment liquid in Example 1, use was made of a 10% by mass of water-resisting treatment liquid wherein only bis (hexamethylene)triamine hydrochloride was dissolved in water. Furthermore, in the same way as in Example 1, the film was immersed in water, and then observed. As a result, the water-resistant-polarizing film of Comparative Example 3 was not dissolved in water.

About the water-resistant polarizing film of Comparative Example 3 also, in the same way as in Example 1, a variation in each of the transmittance and the degree of polarization was obtained before and after the heating, and before and after the humidifying. The results are shown in Table 3 and FIG. 1.

Comparative Example 4

A water-resistant polarizing film was produced in the same way as in Example 1 except that instead of the water-resisting treatment liquid in Example 1, use was made of a 10% by mass of water-resisting treatment liquid wherein only 2-2'-oxybis ethylene diamine hydrochloride was dissolved in water. Furthermore, in the same way as in Example 1, the film was immersed in water, and then observed. As a result, the water-resistant-polarizing film of Comparative Example 4 was not dissolved in water.

About the water-resistant polarizing film of Comparative Example 4 also, in the same way as in Example 1, a variation in each of the transmittance and the degree of polarization was obtained before and after the heating, and before and after the humidifying. The results are shown in Table 3 and FIG. 1.

Comparative Example 5

A water-resistant polarizing film was produced in the same way as in Example 1 except that instead of the water-resisting treatment liquid in Example 1, use was made of a 10% by mass of water-resisting treatment liquid wherein barium chloride (manufactured by Tokyo Chemical Industry Co., Ltd.) was dissolved in water. Furthermore, in the same way as in Example 1, the film was immersed in water, and then observed. As a result, the water-resistant-polarizing film of Comparative Example 5 was not dissolved in water.

About the water-resistant polarizing film of Comparative Example 5 also, in the same way as in Example 1, a variation in each of the transmittance and the degree of polarization was obtained before and after the heating, and before and after the humidifying. The results are shown in Table 3 and FIG. 1.

Comparative Example 6

A water-resistant polarizing film was produced in the same way as in Example 1 except that the water-resisting treatment was not conducted. Furthermore, in the same way as in Example 1, the film was immersed in water, and then observed. As a result, whole of the polarizing film of Comparative Example 6 was dissolved in water.

The polarizing film of Comparative Example 6 does not have water resistance since it dissolves in water. Thus, the heating test and the humidifying test were not conducted to the polarizing film of Comparative Example 6.

The organic nitrogen compounds used in each of Examples and Comparative Examples are shown in below.

[chemical formula 6]

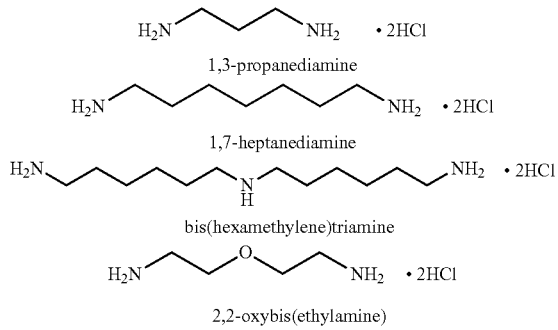

[Evaluation]

When use was made of a water-resisting treatment liquid containing first and second organic nitrogen compounds different from each other in nitrogen-atom-interval distance to conduct a water-resisting treatment as in Examples 1 to 4, the variation in each of the transmittance and the degree of polarization was ±2% or less. Accordingly, about the water-resistant polarizing films of Examples 1 to 4, it was verified that optical properties thereof were hardly changed even at high temperature and high humidity.

By contrast, in the case of using a water-resisting treatment liquid containing only one organic nitrogen compound as in Comparative Examples 1 to 4, the variation in the transmittance or the degree of polarization turned more than ±2%.

INDUSTRIAL APPLICABILITY

The water-resistant polarizing film of the present invention may be used as an image display device such as a liquid crystal display device, or polarized sunglasses.

The process for producing the present invention can be preferably used when the water-resistant polarizing film is produced.

What is claimed is:

1. A water-resistant polarizing film, comprising an organic colorant having an anionic group, and organic nitrogen compounds,
   wherein the organic nitrogen compounds include a first organic nitrogen compound having at least two nitrogen atoms in the molecule thereof, and a second organic nitrogen compound having at least two nitrogen atoms in the molecule thereof,
   the distance (A) between adjacent nitrogen atoms in the first organic nitrogen compound is shorter than the distance (B) between adjacent nitrogen atoms in the second organic nitrogen compound, and
   the nitrogen atoms are contained in a cationic group.

2. The water-resistant polarizing film according to claim 1, wherein the first organic nitrogen compound and the second organic nitrogen compound are each a noncyclic compound.

3. The water-resistant polarizing film according to claim 1, wherein the ratio of the distance (A) between the nitrogen atoms in the first organic nitrogen compound to the distance (B) between the nitrogen atoms in the second organic nitrogen compound, A/B, is 0.10 to 0.99.

4. The water-resistant polarizing film according to claim 1, wherein the distance (A) between the nitrogen atoms in the first organic nitrogen compound is 0.30 to 0.70 nm, and the distance (B) between the nitrogen atoms in the second organic nitrogen compound is from 0.71 to 1.80 nm.

5. The water-resistant polarizing film according to claim 1, wherein the first organic nitrogen compound is included at least in an equal amount of the second organic nitrogen compound.

6. The water-resistant polarizing film according to claim 1, wherein the first organic nitrogen compound and the second organic nitrogen compound each consists of 2 to 5 nitrogen atoms in the molecule thereof.

7. The water-resistant polarizing film according to claim 1, wherein the cationic group is an amino group or a salt thereof.

8. The water-resistant polarizing film according to claim 1, wherein the first organic nitrogen compound and the second organic nitrogen compound are each a compound having an amino group or a salt thereof at each of both molecular terminals thereof.

9. The water-resistant polarizing film according to claim 1, wherein the first organic nitrogen compound and the second organic nitrogen compound each are at least one independently selected from aliphatic diamines or salts thereof, aliphatic triamines or salts thereof, and aliphatic ether diamines or salts thereof.

10. An image display device, having the water-resistant polarizing film as recited in claim 1.

11. A process for producing a water-resistant polarizing film, comprising a step of bringing a water-resisting treatment liquid which comprises organic nitrogen compounds into contact with at least one surface of a polarizing film comprising an organic colorant having an anionic group, wherein the organic nitrogen compounds include a first organic nitrogen compound having at least two nitrogen atoms in the molecule thereof, and a second organic nitrogen compound having at least two nitrogen atoms in the molecule thereof, the distance (A) between the nitrogen atoms in the first organic nitrogen compound is different from the distance (B) between the nitrogen atoms in the second organic nitrogen compound, and the nitrogen atoms are contained in a cationic group.

* * * * *